April 11, 1961  N. J. D'ALEANDRO ET AL  2,978,884
REFRIGERATION APPARATUS
Filed Sept. 9, 1959
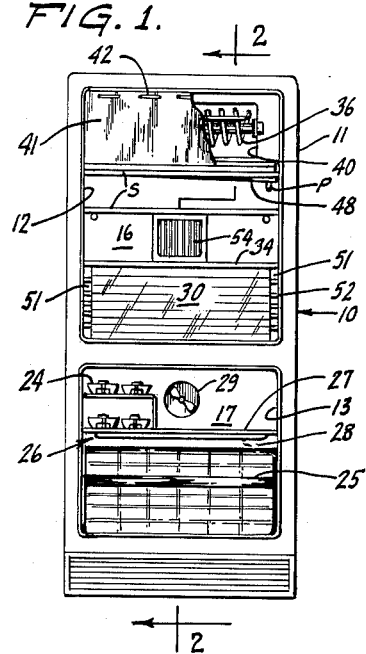
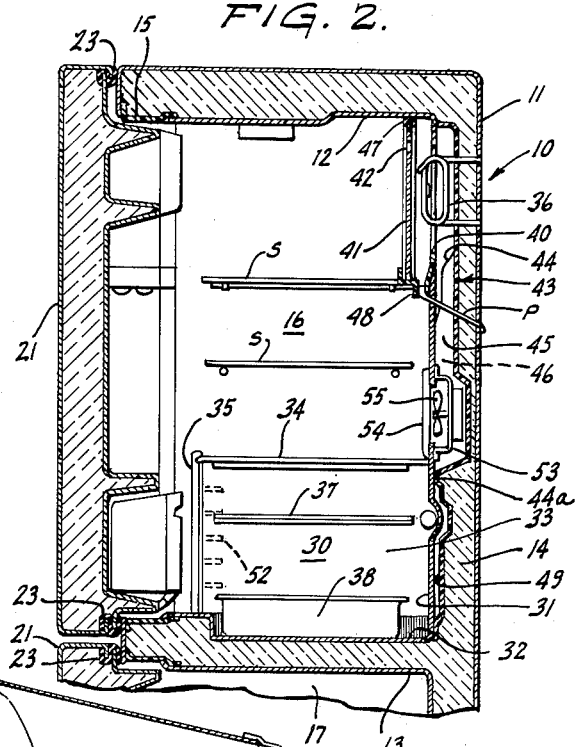
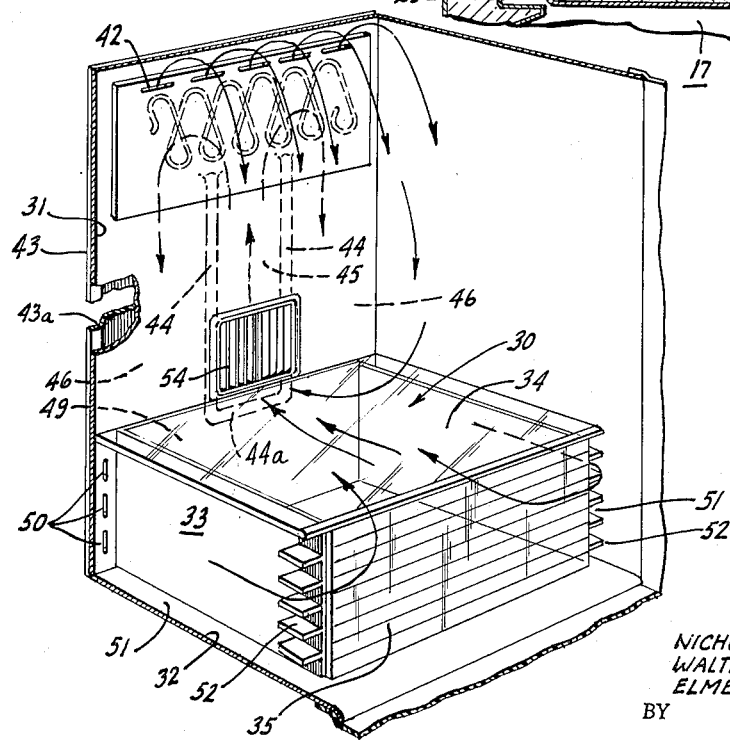
INVENTORS
NICHOLAS J. D'ALEANDRO
WALTER G. MOCEY
ELMER W. ZEARFOSS, JR.
BY
AGENT

2,978,884

REFRIGERATION APPARATUS

Nicholas J. D'Aleandro, Walter G. Mocey, and Elmer W. Zearfoss, Jr., Philadelphia, Pa., assignors to Philco Corporation, Philadelphia, Pa., a corporation of Pennsylvania Filed Sept. 9, 1959, Ser. No. 838,953

10 Claims. (Cl. 62—413)

This invention relates to refrigeration apparatus, and more particularly to refrigeration apparatus of the type providing for selective storage of articles at controlled different ambient conditions.

While of broader applicability the invention has particular utility in the field of domestic refrigerators wherein it is desirable to provide optimum storage conditions for the extended preservation of a variety of perishable foods, such for example as fresh meats, vegetables, fruits, dairy products and "leftovers."

To extend the storage life of foods, changes tending to cause deterioration must be retarded. For example, it is known that chemical and microbial changes are minimized by the storage of foods in low temperature ambient atmospheres. Also, changes such as food drying and shrivelling, which have long been encountered by users of domestic refrigerators, depend upon the humidity and movement of the surrounding air, as well as upon the surface characteristics of the food. Results of efforts directed toward overcoming the foregoing difficulties have indicated that optimum storage of most foods in a household refrigerator is achieved by maintenance of a near-freezing temperature, high humidity, and relatively still air. This teaching, in its broader aspect, is disclosed and claimed in the copending application of Elmert W. Zearfoss, Jr., Serial No. 229, filed January 4, 1960, and assigned to the assignee of the present invention which represents an improvement thereover.

It is therefore a general objective of the present invention to provide, within a single refrigerated cabinet, apparatus overcoming the above mentioned difficulties and providing optimum ambient atmospheric conditions for the storage of foods of different types.

In the achievement of the foregoing objectives, and in accordance with a preferred embodiment of the invention, a separately sealed storage chamber is disposed within the main food compartment of a refrigerator. A cooling coil is disposed in air flow communication with the interior of the food compartment, and a fan is disposed and adapted to withdraw air from the compartment and to direct it over the cooling coil. Air which has been cooled is then divided, whereby one portion is vented or discharged through suitable port means to the upper region of the food compartment, while another portion of the cooled air is forced downwardly through duct means and vented to lower regions of the food compartment. The sealed chamber is disposed cooperatively with the walls of the food compartment to form additional duct means for the downwardly discharged cooled air, whereby the latter after venting flows over walls of the sealed chamber prior to entry into the main storage area of the food compartment, thereby to provide within the chamber a controlled low temperature zone having a high humidity and relatively still air.

We have found that, by virtue of the foregoing arrangement, substantially gradient-free temperature zones can be maintained in both the food compartment and within the sealed chamber. Also, there is advantageously achieved quick recovery to optimum temperature values following usage, as well as the prevention of freezing of foods in both the main compartment and the sealed chamber.

The manner in which the foregoing as well as other objects and advantages of the invention may best be achieved wil be more clearly understood from a consideration of the following description taken in light of the accompanying drawing, in which:

Figure 1 is an elevational view, with parts removed, of a refrigerator embodying the invention;

Figure 2 is a sectional view, on an enlarged scale, of the refrigerator shown in Figure 1, the view being taken substantially through the plane indicated by arrows 2—2 applied to Figure 1; and Figure 3 is a somewhat diagrammatic perspective showing, with parts removed, of apparatus seen in Figures 1 and 2.

Now making more particular reference to the drawing, it will be seen, from Figures 1 and 2, that the invention is embodied in a domestic or household refrigerator which comprises a cabinet 10 having an outer shell 11 and a pair of inner liners 12 and 13, said shell and liners being spaced and insulated from each other by means of suitable insulation 14. As is customary, breaker strips 15 of low thermal conductivity extend about the forward edges of the cabinet 10 and bridge the gaps between the shell 11 and inner liners 12 and 13. These liners define two isolated areas which constitute, respectively, an upper compartment 16 and a lower compartment 17. While no door has been shown in Figure 1, for the sake of convenience, there is seen in Figure 2 a pair of insulated doors 21. The doors are of the usual construction, each including gasket strips 23, and close the front access opening of said compartments 16 and 17.

The lower compartment 17 is utilized for the storage of frozen food (not shown) and ice trays 24, as well as for the quick freezing of articles. According to usual practice, the lower compartment is supplied with a slidable drawer or rack 25 for supporting food out of contact with conventional evaporator means 26 including a refrigerated shelf 27 provided with refrigerant conduit means 28 disposed in heat exchange relation therewith. As shown, a fan 29 is preferably positioned within compartment 17 to effect circulation of air therein.

The upper compartment 16 has disposed therein a substantially enclosed chamber 30 having rear, side, top and bottom walls formed preferably of material providing a relatively high thermal conductivity, for reasons hereinafter to be more fully explained. For example, respective rear and bottom walls 31 and 32 comprise portions of the metal liner 12, and the side walls 33 comprise metal partitions extending forwardly from rear wall 31, as best seen in Figure 3, and spaced inwardly of the side wall of liner 12. The top wall 34 of chamber 30 is conveniently made of glass, and, along with shelves S, serves as storage shelving for articles placed in upper compartment 16. Closure of chamber 30 is provided by an access door 35, also of glass, hingedly mounted, by suitable means not shown, along its lower edge to bottom wall 32. A shelf 37 and receptacle 38 are disposed within the chamber for convenient storage of articles therein.

Means by which upper compartment 16 is effectively cooled and maintained at non-freezing temperatures includes an auxiliary evaporator 36 preferably in the form of a generally helical coil of tubing having spaced individual turns. The coil extends from one side of the compartment to the other and its axis is disposed in a substantially horizontal plane. Coiled evaporator 36 is mounted in an upper rear region of cabinet 10 and in substantial alignment with a cutout portion 40 of upper compartment liner 12. A decorative plate 41 substantially overlies cutout portion 40 and has port means comprising a series of small slots 42 providing air flow communication between the region surrounding evaporator coil 36 and the upper compartment 16. Upper and side edges of the plate 41 are sealed against the top and side walls of liner 12 by means of a gasket 47, and the lower edge of the plate is disposed within a drain trough 48. The trough 48 has a portion disposed substantially below coil 36 to catch any moisture dripping from the coil, for example during periods of coil defrosting, and a drain pipe P carries the moisture away for disposal by known suitable means (not shown).

Apparatus embodying the invention is additionally characterized by the provision of a generally concave panel 43 having peripheral flange portion 43a (Figure 3) disposed against the rear wall of compartment liner 12, said panel further being disposed between the latter and insulation 14. Rib means 44, preferably but not necessarily formed integrally with the panel 43, extends between the liner rear wall and the panel. Rib means 44 extends along the panel in the form of a U with the open portion presented upwardly and the loop portion extending horizontally, as seen at 44a, in the region of upper wall 34 of chamber 30. The aforesaid panel 43, including flange portion 43a and rib means 44, cooperatively define with the cabinet liner rear wall a series of substantially parallelly disposed air flow ducts or conduits including a centrally disposed duct 45 that extends upwardly from rib means loop portion 44a to the region of evaporator coil 36.

A pair of vertically extending ducts 46, defined by ribs 44 and the closed confronting edges of the liner 12 and panel 43, are disposed adjacent central duct 45 in such manner that the pair of ducts straddle the central duct, extend downwardly from the region of coil 36, and terminate in a plenum region 49 disposed adjacent the rear wall 31 of chamber 30 and below loop portion 44a of rib means 44. A series of openings 50 are provided in the rear wall of liner 12 between side walls 33 of chamber 30 and side walls of the liner. Openings 50 provide air flow communications between ducts 46 and the duct-like regions 51 included between the side walls 33 and side walls of cabinet liner 12. The regions 51 are in air flow communications with the upper compartment 16 through the agency of louvers 52 located substantially in a plane common to access door 35.

The lower portion of central duct 45 is disposed in registry with an opening 53 in the rear wall of cabinet liner 12. Overlying opening 53 is a grill 54, behind which grill there is positioned a fan 55.

Fan 55 is operable to provide for inlet of air, through grill 54, to central duct 45. As best seen in Figure 3, air entering duct 45 is forced upwardly and over the coils of evaporator 36, then a major portion flows downwardly through side ducts 46, and over the rear and side walls 31, 33 of sealed chamber 30 whereby to cool the latter. This air then flows through louvers 52 back into the compartment 16. Another portion of the air drawn into central duct 45 and forced over the evaporator coil flows through vent means or slots 42 into compartment 16. By forcing cooled air through slots 42 any tendency for air to stratify within compartment 16 advantageously is minimized, thereby ensuring prevention of warm air "pockets" within the upper portions of the compartment.

In accordance with well known practice, evaporator coils 26 and 36 are fed low pressure refrigerant by conventional compressor and condenser means (not shown) disposed in fluid flow communication therewith, and while disclosure thereof is not necessary for an understanding of the present invention, control means for regulating flow of refrigerant through the evaporator coils 26 and 36, serially, toward the attainment of desirable storage temperatures within compartments 16 and 17 and chamber 30, may be of conventional design utilizing a single control element located at the coil 36. Preferably, the control should cause the evaporator coil 36 to operate cyclically between above-freezing and below-freezing temperatures to provide for defrosting the coil upon each cycle. A suitable refrigerating apparatus of this type is disclosed and claimed in the copending application of Nicholas J. D'Aleandro, entitled "Refrigeration Apparatus," filed December 24, 1958, bearing Serial No. 782,730, and assigned to the assignee of the present invention.

Additional control means (not shown) may be provided for effecting, during operation of coil 36, cyclic "on" and "off" operation of fan 55 in response to predetermined, desired air temperature limits within compartment 16.

In summation, it is seen that the present invention advantageously utilizes the principle of air stratification to maintain the desired temperature differential between the chamber 30 and compartment 16. By positioning the chamber 30 below compartment 16, air stratification tends toward maintenance of a warmer temperature within compartment 16 than prevails in chamber 30. It will be understood, of course that reference is here made to a stratification as between two superposed compartments, there being very little stratification within each compartment.

Maintenance within chamber 30 of a substantially saturated atmosphere and a uniform low dry bulb temperature is achieved by bathing exterior portions of the side, front, and rear chamber walls with relatively cold air flowing from the region of coil 36. It should be understood that there exists a significant cooperative relationship between chamber 30 and freezing compartment 16, since flow of heat into chamber 30 through bottom wall 32 is effectively blocked due to the adjacency thereto of the freezing compartment 16. However, should it be desirable, it would also be possible to embody the invention in apparatus in which the air duct means extend into heat exchange relation with the bottom wall to enhance attainment of uniform chamber wall temperatures. By utilizing thermally conductive material for walls of the chamber 30, temperature gradients both within and between adjacent walls, tending to induce thermosyphonic movement of air in the chamber and to lower the relative humidity therein, advantageously are minimized.

Further advantages are derived from disposing the sealed lower temperature chamber 30 below the higher temperature compartment 16, whereby heat flows from the compartment to the chamber substantially solely through top wall 34 of the latter thereby increasing the temperature of the wall to obviate accumulation of moisture thereon. Since the only substantial heat flow into chamber 30 is through its top wall 34, and not through the relatively cold side or bottom walls, any tendency toward formation of convectional air currents within the chamber is curtailed.

The high temperature-low humidity ambient atmosphere achieved within compartment 16 advantageously coincides with the storage requirements of such articles as canned and bottled foods, and such other foods as are not easily dessicated or deteriorated in ambient atmospheres of this type. It will be understood, additionally, that the chamber 30 is best adapted for the storage and preservation of perishable foods such, for example, as fresh meats, vegetables, fruits, dairy products, and "leftovers" by reason of the low temperature, high humidity and low air circulation achieved therein.

While a single, preferred embodiment of the invention has been disclosed, it will be understood that such modifications are contemplated as fall within the scope of the appended claims.

We claim:
1. In refrigeration apparatus, the combination comprising: an insulated storage compartment; a substantially enclosed chamber disposed in a lower portion of said compartment and having walls formed of a material of relatively high thermal conductivity; an air cooling element disposed adjacent an upper portion of said insulated compartment; first air duct means inletted from said compartment in a region intermediate said cooling element and said enclosed chamber and leading upwardly to said cooling element; second air duct means disposed in air flow communication with said first duct means in the region of said cooling element and leading downwardly from said cooling element to said compartment, said second duct means including a portion disposed in high heat exchange relation with walls of said enclosed chamber; and means for circulating air sequentially through said first duct means, over said cooling element, and through said second duct means.

2. Apparatus in accordance with claim 1, wherein an upper horizontal wall portion of said chamber is disposed and adapted to separate the latter from said insulated compartment.

3. Apparatus in accordance with claim 2 wherein said compartment comprises a higher temperature zone and said chamber comprises a lower temperature zone.

4. In refrigeration apparatus, the combination comprising: walls defining a food storage area; a sealed crisper area disposed below said storage area, said crisper area having side wall portions formed of a material of high thermal conductivity and a bottom wall portion of low thermal conductivity, horizontally extending partition means formed of a material having a thermal conductivity intermediate the mentioned conductivities and separating said food storage area from said crisper area; a cooling element; first air duct means providing for air flow directly from said food storage area to said cooling element; second air duct means leading from said cooling element to said storage area and including portions disposed in high heat exchange relation with thermally conductive side wall portions of said crisper area; thereby to provide for cooling the latter; and means operative to circulate air from said food storage area sequentially through said first and second duct means and thence back into said food storage area.

5. In refrigeration apparatus, a higher temperature compartment, a sealed intermediate temperature chamber disposed below said higher temperature compartment, and a lower temperature compartment disposed below said intermediate temperature chamber, said sealed intermediate chamber having side wall portions formed of a material of high thermal conductivity; horizontally extending thermally insulative partition means separating said lower temperature compartment from said sealed intermediate temperature chamber and forming a lower wall portion of the chamber; horizontally extending partition means of a material having a relatively high thermal conductivity separating said higher temperature compartment from said sealed intermediate temperature chamber and forming an upper wall portion of the chamber; a cooling element; first air duct means leading from the interior of said higher temperature compartment to said cooling element; second air duct means extending between said cooling element and the interior of said higher temperature compartment and including portions disposed in high heat exchange relation with side wall portions of said sealed intermediate temperature chamber to provide substantially the entire cooling for said sealed chamber; and means for circulating air through said first and second duct means.

6. In a refrigerator including an insulated compartment having a substanitally sealed chamber disposed in a lower portion thereof, a duct system disposed in fluid flow communication with said compartment, said duct system including a first conduit through which air moves upwardly, a second conduit communicating with said first conduit and through which air moves downwardly, said first and second conduits communicating in the region of an upper portion of said compartment, a third conduit communicating with a lower portion of said second conduit and disposed adjacent, and in high heat exchange relation with, said sealed chamber, a cooling element disposed in the region of juncture of said first and second conduits, and fan means disposed and adapted to withdraw air from the compartment and into said first conduit for cyclic serial flow through said first, second and third conduits.

7. In a refrigerator including an insulated higher temperature compartment having a sealed lower temperature chamber disposed in a lower portion thereof, a duct system disposed in fluid flow communication with said higher temperature compartment, said duct system including a first conduit through which air moves upwardly, a second conduit communicating with said first conduit and through which air moves downwardly, said first and second conduits communicating in the region of an upper portion of said compartment, a third conduit communicating with a lower portion of said second conduit and disposed adjacent said sealed lower temperature chamber, a cooling element disposed in the region of juncture of said first and second conduits, and fan means disposed and adapted to withdraw air from the compartment into said first conduit for cyclic serial flow through said first, second, and third conduits.

8. A refrigerator in accordance with claim 7 wherein said lower temperature chamber includes walls formed of a material of low thermal conductivity.

9. Refrigeration apparatus, comprising: a generally rectangular storage compartment having top, bottom, and side walls, and a rear wall of a material of relatively high thermal conductivity, said rear wall having an aperture and first and second port means formed therein, said aperture being disposed in an upper region of said rear wall, said first port means including openings disposed in lower corner regions of said rear wall, and said second port means being disposed intermediate said aperture and said first port means; plate means having vent means therein and overlying said aperture; evaporator means adjacent said aperture; a substantially enclosed chamber disposed within said compartment and defined in part by said rear and bottom compartment walls and including side wall portions of a material of relatively high thermal conductivity and disposed in spaced confronting relation to said compartment side walls to form regions in fluid flow communication with said rear wall port means a concave panel having peripheral flange portions engaging confronting outer surface portions of said compartment rear wall and having its region of concavity presented toward said aperture and said first and second port means; U-shaped rib means extending transverse said compartment rear wall and said panel, said rib means having an open upper portion in the region of said evaporator means and loop portion disposed along the periphery of said second rear wall port means; and fan means disposed and adapted to draw air from said compartment through said second port means and to force it upwardly between said rib means, over said coil means, a first portion of the air so forced being caused to flow through said plate vent means, and a second portion of the air so forced being directed downwardly between said rib means and said flange portions, said second air portion thereafter being caused to flow in high heat exchange relation with the compartment rear wall, out of said first port means, and thence over said chamber side to return to said compartment.

10. In a refrigerator including a compartment having a substantially sealed chamber disposed in a lower portion thereof, a duct system disposed in fluid flow communication with said compartment, said duct system including first conduit means through which air moves upwardly, second conduit means communicating with said first conduit means and through which air moves downwardly, third conduit means communicating with a portion of said second conduit means and disposed adjacent, and in high heat exchange relation with, said sealed chamber, a cooling element disposed in heat exchange relation with said second conduit means, and air moving means disposed and adapted to withdraw air from the compartment and into said first conduit means for cyclic serial flow through said first, second, and third conduit means.

References Cited in the file of this patent

UNITED STATES PATENTS

| | | |
|---|---|---|
| 2,024,082 | Woodruff | Dec. 10, 1935 |
| 2,826,046 | Tobiasz | Mar. 11, 1958 |

UNITED STATES PATENT OFFICE
CERTIFICATION OF CORRECTION

Patent No. 2,978,884                         April 11, 1961

Nicholas J. D'Aleandro et al.

It is hereby certified that error appears in the above numbered patent requiring correction and that the said Letters Patent should read as corrected below.

Column 1, line 39, for "Elmert" read -- Elmer --; column 2, line 7, for "wil" read -- will --; column 5, line 72, for "substanitally" read -- substantially --; column 6, line 49, after "means" insert a semicolon.

Signed and sealed this 29th day of August 1961.

(SEAL)
Attest:

ERNEST W. SWIDER
Attesting Officer

DAVID L. LADD
Commissioner of Patents